United States Patent
Schuster et al.

(10) Patent No.: US 8,332,458 B2
(45) Date of Patent: Dec. 11, 2012

(54) MONITORING THRESHOLD FUNCTIONS OVER DISTRIBUTED DATA SETS

(75) Inventors: Assaf Schuster, Haifa (IL); Daniel Keren, Tivon (IL); Izchak Sharfman, Tel-Aviv (IL)

(73) Assignee: Technion Research & Development Foundation Ltd., Haifa (IL)

( * ) Notice: Subject to any disclaimer, the term of this patent is extended or adjusted under 35 U.S.C. 154(b) by 861 days.

(21) Appl. No.: 12/293,383

(22) PCT Filed: Mar. 14, 2007

(86) PCT No.: PCT/IL2007/000333
§ 371 (c)(1),
(2), (4) Date: Apr. 8, 2009

(87) PCT Pub. No.: WO2007/107979
PCT Pub. Date: Sep. 27, 2007

(65) Prior Publication Data
US 2009/0310496 A1    Dec. 17, 2009

Related U.S. Application Data

(60) Provisional application No. 60/783,418, filed on Mar. 20, 2006.

(51) Int. Cl.
*G06F 15/16* (2006.01)
(52) U.S. Cl. ........................................ 709/201; 370/252
(58) Field of Classification Search .................. None
See application file for complete search history.

(56) References Cited

U.S. PATENT DOCUMENTS

2005/0198270 A1 *    9/2005    Rusche et al. ................ 709/224

OTHER PUBLICATIONS

Ankur Jain, et al., "A Wakeup Call for Internet Monitoring Systems: The Case for Distributed Triggers", 2004, pp. 1-6.*
Carney, et al., in "Monitoring Streams—a New Class of Data Management Applications," Proceedings of the 28 International Conference on Very Large Data Bases (VLDB), Hong Kong, China, Aug. 20-23, 2002, pp. 215-226.
Cherniack, et al., in "Scalable Distributed Stream Processing," Proceedings of the First Biennial Conference on Innovative Data Systems Research (CIDR), Jan. 5-8, 2003, Asilomar, California.
Babu- and Widom in "Continuous Queries over Data Streams," ACM SIGMOD Record, (30:3), Sep. 2001, pp. 109-120.

(Continued)

*Primary Examiner* — George C Neurauter
*Assistant Examiner* — Suraj Joshi
(74) *Attorney, Agent, or Firm* — Fish & Richardson P.C.

(57) ABSTRACT

A method for distributed computing includes processing multiple sets of data at respective computing nodes (24), and calculating respective local values of one or more statistical parameters characterizing the sets of the data. A global condition is defined, such that the condition is violated when a function defined over a weighted average of the respective local values crosses a predetermined threshold. The global condition is separated into a plurality of local constraints, which include a respective local constraint to be evaluated by each of the nodes based on the respective local values, such that violation of the respective local constraint in at least one of the nodes indicates a violation of the global condition. The local constraint is evaluated independently at each of the nodes. When at least one of the nodes detects that the respective local constraint is violated, an indication that the global condition has been violated is produced.

19 Claims, 7 Drawing Sheets

OTHER PUBLICATIONS

Terry, et al., in "Continuous Queries over Append—Only Databases," Proceedings of the 1992 ACM International Conference on Management of Data (SIGMOD), San Diego, California, Jun. 2-5, 1992, pp. 321-330.

Dilman andRaz,"EffiCient Reaetiv6Monitoring," Proceedirigsofthe 20 Annual Joint Conference of the IEEE Computer and Communications Societies (INFOCOM), Apr. 2001, pp. 1012-1019.

Manjhi et al., "Finding (Recently) Frequent Items in Distributed Data Streams," Proceedings of the 21 International Conference on Data Engineering (ICDE), Tokyo, Japan, Apr. 15-8, 2005, pp. 767-778.

Bulut, et al., "Distributed Data Streams Indexing using Content-Based Routing Paradigm," Proceedings ofthe 19 IEEE International Parallel and Distributed Processing Symposium (IPDPS), Denver, Colorado, Apr. 3-8, 2005, p. 94.

Cormode, et al., in "Holistic Aggregates in a Networked World: Distributed Tracking of Approximate Quantiles," Proceedings of SIGMOD 2005, Baltimore, Maryland, Jun. 14-15,2005, pp. 25-36.

Olston, et al., "Adaptive Filters for Continuous Queries over Distributed Data Streams," Proceedings of the 2003 ACM SIGMOD Conference, San Diego, California, Jun. 9-12, 2003, pp. 563-574.

Babcock and Olston, "Distributed Top-k Monitoring," Proceedings of the 2003 ACM SIGMOD Conference, San Diego, California, Jun. 9-12, 2003, pp. 28-39.

Gibbons and Tirthapura "Estimating Simple Functions on the Union of Data Streams," Proceedings of the 13 Annual ACM Symposium on Parallel Algorithms and Architectures (SPAA), Crete, Greece, Jul. 4-6, 2001, pp. 281-291.

Gibbons and Tirthapura "Distributed Streams Algorithms for Sliding Windows," Proceedings of the 14 Annual ACM SPAA, Winnipeg, Canada, Aug. 11-13, 2002.

Itzchak Sharfman, et al., "A Geometric Approach to Monitoring Threshold Functions Over Distributed Data Streams" SIGMOD 2006.

Ankur Jain, et al., "A Wakeup Call for Internet Monitoring Systems: The Case for Distributed Triggers", 2004.

* cited by examiner

MONITORING THRESHOLD FUNCTIONS OVER DISTRIBUTED DATA SETS

CROSS REFERENCE TO RELATED APPLICATIONS

This application is the U.S. national phase of International Application No. PCT/IL2007/000333, filed Mar. 14, 2007, which claims priority from U.S. Provisional Patent Application 60/783,418, filed Mar. 20, 2006, which is assigned to the assignee of the present application and whose disclosure is incorporated herein by reference. The International Application was published in English on Sep. 27, 2007 as WO 2007/107979 under PCT Article 21 (2).

FIELD OF THE INVENTION

The present invention relates generally to distributed systems, and particularly to methods and systems for monitoring and evaluating functions defined over distributed data sets.

BACKGROUND OF THE INVENTION

Various systems and applications perform monitoring of data streams in a distributed environment. Such applications include, for example, sensor networks, distributed web-sites, distributed intrusion detection systems, distributed data communication applications and many others. Methods for monitoring distributed data streams are described, for example, by Carney, et al., in "Monitoring Streams—a New Class of Data Management Applications," Proceedings of the 28th International Conference on Very Large Data Bases (VLDB), Hong Kong, China, Aug. 20-23, 2002, pages 215-226, and by Cherniack, et al., in "Scalable Distributed Stream Processing," Proceedings of the First Biennial Conference on Innovative Data Systems Research (CIDR), Jan. 5-8, 2003, Asilomar, Calif. These publications are incorporated herein by reference.

In some data stream monitoring applications, continuous queries, such as monitoring queries, are specified over the data. Continuous queries are described, for example, by Babu and Widom in "Continuous Queries over Data Streams," ACM SIGMOD Record, (30:3), September 2001, pages 109-120, and by Terry, et al., in "Continuous Queries over Append-Only Databases," Proceedings of the 1992 ACM International Conference on Management of Data (SIGMOD), San Diego, Calif., Jun. 2-5, 1992, pages 321-330, which are incorporated herein by reference.

Several methods for evaluating monitoring queries are known in the art. For example, Dilman and Raz describe a process for detecting when a sum of a distributed set of variables exceeds a predetermined threshold in "Efficient Reactive Monitoring," Proceedings of the 20th Annual Joint Conference of the IEEE Computer and Communications Societies (INFOCOM), April, 2001, pages 1012-1019, which is incorporated herein by reference. Manjhi et al., describe a process of finding frequently-occurring items in a set of distributed streams in "Finding (Recently) Frequent Items in Distributed Data Streams," Proceedings of the 21st International Conference on Data Engineering (ICDE), Tokyo, Japan, Apr. 5-8, 2005, pages 767-778, which is incorporated herein by reference.

As another example, Bulut, et al., describe a process for detecting similar sets of streams among a large set of distributed streams in "Distributed Data Streams Indexing using Content-Based Routing Paradigm," Proceedings of the 19th IEEE International Parallel and Distributed Processing Symposium (IPDPS), Denver, Colo., Apr. 3-8, 2005, page 94, which is incorporated herein by reference. Yet another process, which approximates quantiles over distributed streams, is described by Cormode, et al., in "Holistic Aggregates in a Networked World: Distributed Tracking of Approximate Quantiles," Proceedings of SIGMOD 2005, Baltimore, Md., Jun. 14-15, 2005, pages 25-36, which is incorporated herein by reference.

Olston, et al., describe a centralized processor, which monitors continuous queries over distributed data in "Adaptive Filters for Continuous Queries over Distributed Data Streams," Proceedings of the 2003 ACM SIGMOD Conference, San Diego, Calif., Jun. 9-12, 2003, pages 563-574, which is incorporated herein by reference. According to the disclosed method, users register continuous queries with precision requirements at the centralized processor, which installs filters at remote data sources. The filters adapt to changing conditions to minimize stream rates while guaranteeing that all continuous queries still receive the updates necessary to provide answers of adequate precision at all times. Babcock and Olston describe a method for determining the k largest values, aggregated over a set of distributed data streams in "Distributed Top-k Monitoring," Proceedings of the 2003 ACM SIGMOD Conference, San Diego, Calif., Jun. 9-12, 2003, pages 28-39, which is incorporated herein by reference.

Gibbons and Tirthapura describe methods for evaluating certain functions over a set of distributed streams in "Estimating Simple Functions on the Union of Data Streams," Proceedings of the 13th Annual ACM Symposium on Parallel Algorithms and Architectures (SPAA), Crete, Greece, Jul. 4-6, 2001, pages 281-291, and in "Distributed Streams Algorithms for Sliding Windows," Proceedings of the 14th Annual ACM SPAA, Winnipeg, Canada, Aug. 11-13, 2002, which are incorporated herein by reference.

SUMMARY OF THE INVENTION

Embodiments of the present invention provide a method for distributed computing, including:

at a plurality of computing nodes, processing respective sets of data and calculating respective local values of one or more statistical parameters characterizing the sets of the data;

defining a global condition, which is violated when a function defined over a weighted average of the respective local values crosses a predetermined threshold;

separating the global condition into a plurality of local constraints, including a respective local constraint to be evaluated by each of the nodes based on the respective local values, such that violation of the respective local constraint in at least one of the nodes indicates a violation of the global condition;

evaluating the respective local constraint independently at each of the nodes; and when at least one of the nodes detects that the respective local constraint is violated, outputting an indication that the global condition has been violated.

In some embodiments, the method includes communicating among the nodes only when the at least one of the evaluated local constraints is violated.

In another embodiment, evaluating the local constraint includes, at each node:

representing the local values as a local statistics vector in a d-dimensional vector space spanned by the statistical parameters;

adjusting the local statistics vector by an offset vector to produce a drift vector, such that a weighted average of the offset vectors used by the respective nodes equals zero;

defining a d-dimensional geometrical shape in the vector space, such that a union of the d-dimensional geometrical shapes defined by the nodes bounds a convex hull of the drift vectors; and determining that the local condition is violated by detecting that the geometrical shape encloses at least two vectors such that the function evaluated at the two vectors produces two respective values that fall on opposite sides of the threshold.

Defining the d-dimensional geometrical shape may include occasionally performing a synchronization process, which includes distributing the local statistics vectors among the nodes, calculating a global estimate vector including a weighted average of the local statistics vectors, and setting the offset vector such that the drift vector coincides with the global estimate vector. In a disclosed embodiment, defining the d-dimensional geometrical shape includes defining the shape having a minimum volume while containing the drift vector and a common reference vector known to all the nodes. In some embodiment, the common reference vector includes the global estimate vector.

In another embodiment, occasionally performing the synchronization process includes initiating the synchronization process when at least one of the nodes detects that the respective local constraint is violated. In yet another embodiment, distributing the local statistics vectors includes transmitting the local statistics vectors from the nodes to a centralized coordinator node, calculating the global estimate vector by the coordinator node and transmitting the global estimate vector from the coordinator node to the nodes. Alternatively, distributing the local statistics vectors includes broadcasting the respective local statistics vector from each node to the other nodes.

In still another embodiment, determining that the local constraint is violated includes identifying first and second vectors having respective maximum and minimum values of the function within the geometrical shape, and determining that the maximum and minimum values of the function fall on opposite sides of the threshold. In an alternative embodiment, determining that the local constraint is violated includes calculating a minimum distance between a center of the geometrical shape and a d-dimensional surface over which the function is equal to the threshold, and determining that the minimum distance is smaller than a radius of the geometrical shape.

Defining the d-dimensional geometrical shape may include adjusting a subset of the drift vectors by respective slack vectors whose weighted average equals zero, in order to tighten a bound of the convex hull by the union of the geometrical shapes. In an embodiment, defining the global condition includes defining a first threshold and a second threshold larger than the first threshold, and determining that the local condition is violated includes verifying whether the function evaluated over all vectors within the geometrical shape is smaller than the second threshold, and verifying whether the function of all vectors within the geometrical shape is larger than the first threshold.

In some embodiments, the geometrical shape includes a d-dimensional sphere. In an alternative embodiment, the geometrical shape includes a d-dimensional ellipsoid, and the d-dimensional ellipsoids defined by the nodes adhere to ellipsoid parameters defined by a single positive-definite matrix. Further alternatively, the geometrical shape includes a d-dimensional cylinder, and the d-dimensional cylinders defined by the nodes are parallel to one another.

In another embodiment, calculating the statistical parameters includes calculating contingency matrices at the respective nodes, and the function includes an information gain function defined over the weighted average of the contingency matrices. In yet another embodiment, the weighted average is calculated using weights that vary over time.

In a disclosed embodiment, processing the sets of the data includes processing sets of textual items, the statistical parameters characterize appearance of a feature in the textual items, and defining the global condition includes monitoring a global appearance frequency of the feature in the textual items. In some embodiments, the textual items include electronic mail (e-mail) messages, and defining the global condition includes defining an e-mail spam filter for filtering the e-mail messages in which the characterized features appear.

In another embodiment, the statistical parameters characterize the appearance of multiple features in the textual items, and defining the global condition includes identifying a subset of k most-frequent features in the textual items out of the multiple features.

In yet another embodiment, processing the sets of the data includes monitoring a respective distributed data stream at each of the nodes. In still another embodiment, monitoring the data streams includes monitoring outputs of respective sensors, defining the global condition includes defining an alert condition based on the weighted average of the outputs, and outputting the indication includes triggering an alert when the global condition is violated. The sensors may include intrusion detection sensors.

In an embodiment, processing the sets of the data includes processing data that is exchanged with partitions of a distributed data structure. The distributed data structure may include a distributed web-site. Alternatively, the distributed data structure includes a distributed database.

There is also provided, in accordance with an embodiment of the present invention, a computing node in a distributed computation system that includes a plurality of computing nodes that process respective sets of data, the node including:

an interface, which is arranged to receive a set of data; and a processor, which is arranged to calculate local values of one or more statistical parameters characterizing the set of the data, to independently evaluate a local constraint, which is derived from a global condition that is violated when a function defined over a weighted average of the local values calculated by the respective nodes crosses a predetermined threshold such that violation of the respective local constraint in at least one of the nodes indicates a violation of the global condition, and to output an indication that the global condition has been violated when detecting that the local constraint is violated.

There is additionally provided, in accordance with an embodiment of the present invention, a system for distributed computation including a plurality of computing nodes, which are arranged to process respective sets of data, to calculate respective local values of one or more statistical parameters characterizing the monitored sets of the data, to independently evaluate respective local constraints, which are derived from a global condition that is violated when a function defined over a weighted average of the local values calculated by the respective nodes crosses a predetermined threshold such that violation of the respective local constraint in at least one of the nodes indicates a violation of the global condition, and to output an indication that the global condition has been violated when at least one of the nodes detects that the respective local constraint is violated.

There is further provided, in accordance with an embodiment of the present invention, a computer software product for use in a computer serving as a computing node in a distributed computation system that includes a plurality of computing nodes that process respective sets of data, the product including a computer-readable medium, in which program instructions are stored, which instructions, when read by the computer, cause the computer to receive the respective set of the data, to calculate local values of one or more statistical parameters characterizing the monitored set of the data, to independently evaluate a local constraint, which is derived from a global condition that is violated when a function defined over a weighted average of the local values calculated by the respective nodes crosses a predetermined threshold such that violation of the respective local constraint in at least one of the nodes indicates a violation of the global condition, and to output an indication that the global condition has been violated when detecting that the local constraint is violated.

The present invention will be more fully understood from the following detailed description of the embodiments thereof, taken together with the drawings in which:

DETAILED DESCRIPTION OF EMBODIMENTS

Overview

Embodiments of the present invention provide methods and systems for monitoring threshold functions that are defined over distributed sets of data. The distributed computation system comprises a plurality of nodes, which process a respective plurality of data sets. In some embodiments, the data sets comprise distributed data streams that are monitored by the nodes. Each node maintains a set of local statistical parameters, which characterize its respective data set. The system evaluates whether a function of a weighted average of the local statistical parameters (referred to as the global statistics vector) crosses a predetermined threshold.

As will be shown in detail hereinbelow, the task of monitoring whether the function of the global statistics vector crosses the threshold (referred to as the global monitoring task) is represented geometrically in a vector space that is spanned by the monitored statistical parameters. The global task is separated into multiple local geometrical constraints, which are evaluated individually by the nodes. In other words, each node is able to evaluate its local constraint based on its local statistics. As long as all local constraints are met, the global threshold condition is also met (i.e., the function of the global statistics vector does not cross the threshold). When a node detects that its local constraint is violated, it concludes that the global threshold condition may have been violated, and issues an alert or otherwise reacts to the detected local violation.

In the geometrical representation, the set of local statistical parameters maintained by each node is represented by a local statistics vector. The weighted average of the local statistics vectors is represented by a global statistics vector, which is contained within the convex hull of the local statistics vectors. Each node adds an offset vector to its local statistics vector to produce a drift vector. The offset vectors are selected so that their weighted average (i.e., their weighted vector sum) equals zero, and therefore the global statistics vector is contained within the convex hull of the drift vectors.

In some embodiments, each node constructs a minimum-volume sphere, which contains its drift vector and a globally-recognized reference point that is known to all nodes. The union of all spheres bounds the convex hull of the drift vectors. Each node evaluates its local constraint by verifying whether the monitored function falls on the same side of the threshold for all the points in its respective sphere. As long as all the local constraints are met, the entire convex hull of the drift vectors is on the same side of the threshold. Therefore, the global statistics vector, which is contained within the convex hull, does not cross the threshold. When at least one of the local constraints is violated, the global statistics vector is assumed to have crossed the threshold. In alternative embodiments, other types of minimum-volume bodies, such as ellipsoids or cylinders, can also be used.

Typically, the nodes communicate information to one another only when local constraints are violated. During most of the time, the local constraints are met and there is no need for the nodes to communicate. Therefore, the methods and systems described herein are particularly effective in reducing the amount of inter-node communication.

The methods and systems described herein can be carried out either with the assistance of a centralized node, referred to as a coordinator, or in a fully-decentralized manner. Exemplary coordinator-assisted and fully-decentralized configurations are described hereinbelow.

The distributed threshold monitoring methods described herein can be applied in a wide variety of fields and applications, such as in distributed feature selection applications, distributed sensor networks, distributed web-sites, federated databases, distributed intrusion detection systems, distributed event monitoring systems, network monitoring systems, systems that monitor document streams or text streams, and many others.

System Description

Figure 1:
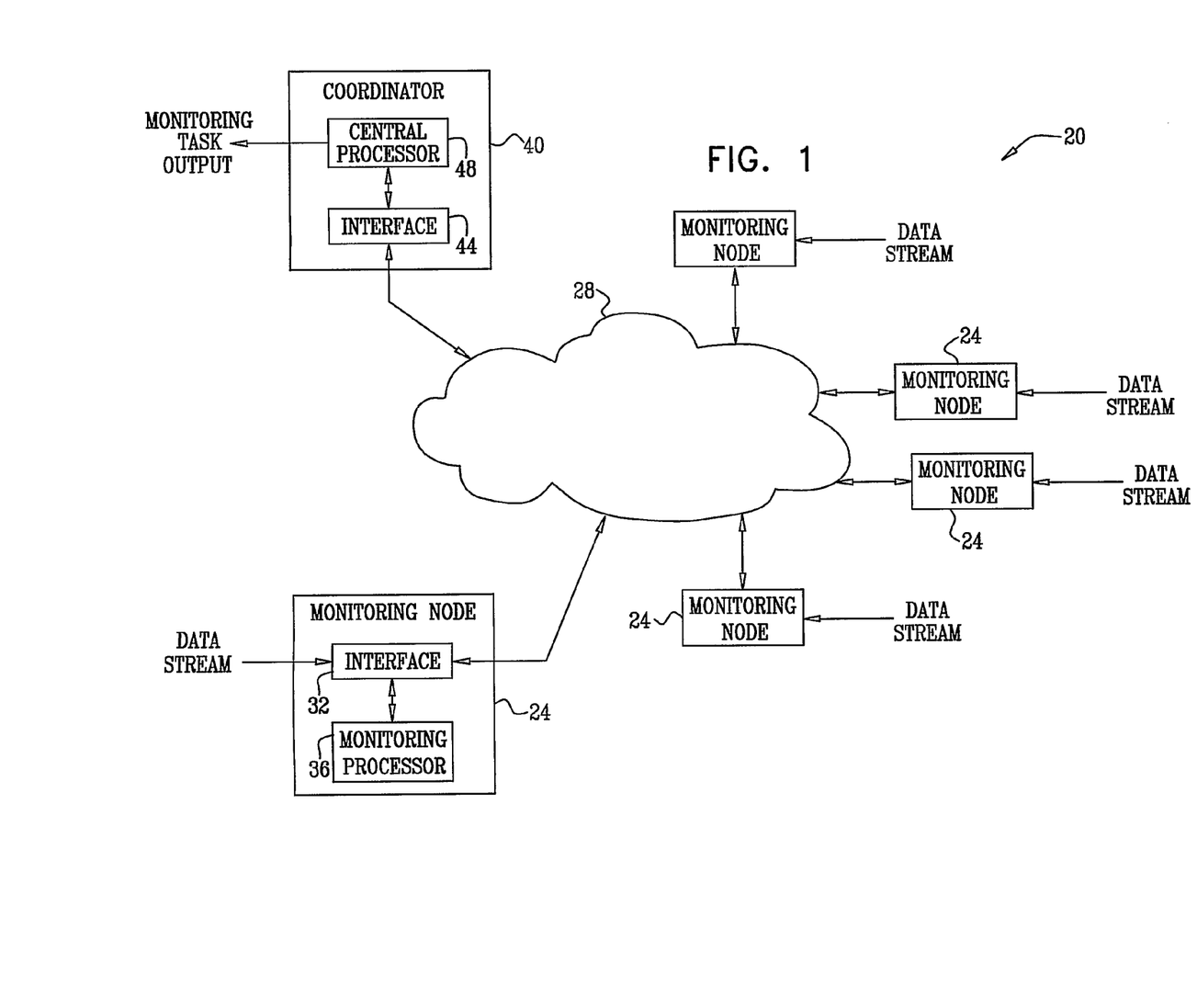
FIG. 1 is a block diagram that schematically illustrates a system for monitoring distributed data streams, in accordance with an embodiment of the present invention.

FIG. 1 is a block diagram that schematically illustrates a system 20 for monitoring distributed data streams, in accordance with an embodiment of the present invention. System 20 comprises multiple monitoring nodes 24. Nodes 24 monitor respective data streams, which are typically provided or produced at distributed locations. Consequently, nodes 24 are distributed, i.e., geographically separated from one another. Nodes 24 are connected by a communication network 28. Network 28 may comprise any sort of local area, metropolitan area or wide area network, or any other suitable communication means. Although some of the embodiments described below refer to nodes that are physically distant from one another, the principles of the present invention are in no way limited to such conditions. Exemplary applications in which the nodes can be adjacent to one another are described further below.

Each node 24 determines a set of local statistics that characterizes its respective data stream. System 20 uses the local statistics maintained by nodes 24 to determine a global threshold condition, which is defined over the multiple distributed data streams. The global threshold condition is evaluated while minimizing the amount of communication carried out by the nodes over network 28.

Each node 24 comprises an interface 32, via which the node accepts the respective data stream and communicates over network 28. Typically, interface 32 comprises separate interfaces for accepting the data stream and for communicating over the network. Each node 24 comprises a monitoring processor 36, which processes the data stream, calculates the local statistics, communicates over network 28 and participates in the calculation of the global threshold condition, as will be described in detail below.

The distributed configuration of system 20 may be used in a wide variety of applications. For example, in some embodiments system 20 comprises an e-mail spam filtering system. In these embodiments, nodes 24 are located in or near certain routers, gateways, mail servers or other elements of a data communication network and monitor e-mail traffic that is accepted at the network elements. The system then uses the local statistics gathered by the nodes to identify features, such as textual phrases, that appear in e-mail messages and whose global frequency is characteristic of spam, and thus to construct a global spam filter to eliminate e-mail messages containing these features. In alternative embodiments, system 20 can be used for feature selection in other textual items and in other systems, such as systems that monitor document streams or text streams, as well as in systems that handle distributed data structures, such as federated databases.

In alternative embodiments, system 20 may monitor a distributed sensor network. In a typical distributed sensor monitoring application, each node 24 monitors the output of a certain sensor, and the system generates an alert when a function defined over the averaged sensor measurements, such as the global variance of the sensor readings, crosses a predetermined threshold. Other distributed event monitoring applications may comprise, for example, distributed intrusion detection systems or network monitoring systems. In these applications, the system typically triggers an alert when a global threshold condition defined over the average of the node outputs is violated.

System 20 may also comprise a system for monitoring the use of a distributed, or mirrored, web-site. In these cases, each node 24 monitors the page requests at a particular server that hosts a mirror of the web-site. In this manner, the web-site operator or other service provider is able to adjust for user demand and possible to identify and deal with attacks on the web-site. System 20 can also be used in other applications that monitor distributed data structures, such as for monitoring queries submitted to a distributed database. In these applications, each node monitors the queries submitted to a certain partition of the database.

System 20 may evaluate various types of global threshold conditions, based on the local statistics collected by the nodes. For example, in the mirrored web-site application, each node 24 maintains the frequency of requests of a particular web page from its designated local mirror. System 20 determines when the global frequency of requests for this page, over the entire set of data streams, exceeds a certain threshold.

As another example, system 20 may comprise an air quality monitoring system. In this exemplary embodiment, nodes 24 monitor the outputs of air quality sensors that are distributed over a certain geographical area. Each node 24 maintains statistics regarding the local concentration of various pollutants. System 20 determines when the global air quality index, which is a function of the statistics averaged over the different sensors, exceeds a certain threshold.

In some embodiments, system 20 comprises a centralized node 40, also referred to as a coordinator, which communicates with nodes 24 and evaluates the global threshold condition. Coordinator 40 may be a separate node, or it may comprise one of nodes 24, which is selected to perform the centralized coordination function. Coordinator 40 comprises an interface 44, via which the coordinator communicates over network 28. The coordinator further comprises a central processor 48, which carries out the threshold condition calculation methods described herein together with processors 36 of nodes 24. In alternative embodiments, nodes 24 determine the global threshold condition in a fully-decentralized manner without using a coordinator or any other centralized processing function.

Typically, processors 36 and processor 48 comprise general-purpose processors, which are programmed in software to carry out the functions described herein. The software may be downloaded to the processors in electronic form, over a network, for example, or it may alternatively be supplied to the computer on tangible media, such as CD-ROM.

Evaluating the global threshold condition inevitably involves some communication between the nodes and the coordinator, and/or among the nodes, over network 28. The methods and systems described herein are particularly effective in minimizing the extent of communication over network 28 that is performed in order to evaluate the global condition.

The global threshold evaluation problem can be formulated as follows. System 20 comprises n monitoring nodes. Each node maintains a d-dimensional local statistics vector denoted $\vec{v}_i(t)$, i=1 ... n. The local statistics vector may have any dimensionality. For example, $\vec{v}_i(t)$ may comprise a single scalar variable, a vector having multiple elements or a matrix of statistical parameters. A global statistics vector $\vec{v}(t)$ is defined as a weighted average of the n local statistics vectors:

$$\vec{v}(t) = \frac{\sum_{i=1}^{n} w_i \vec{v}_i(t)}{\sum_{i=1}^{n} w_i} \quad [1]$$

wherein $w_i$, i=1 ... n, are a set of weighting coefficients. In some cases the averaging is not weighted, i.e., all weighting coefficients are equal to one another. In some cases, when each node monitors its local statistics over a certain "sliding window" time interval, the weight of a node is defined to be proportional to the size of its sliding window.

The global threshold condition can be written as $$f(\vec{v}(t)) > r \quad [2]$$

at any given time t, wherein $f:R^d \rightarrow R$ is the monitored function and r is a predetermined threshold value.

For example, when system 20 comprises an e-mail spam filtering system, each node 24 monitors a stream of incoming e-mail messages processed by a particular mail server. The nodes consider a certain feature (e.g. textual phrase), which may or may not appear in the e-mail messages. The nodes attempt to establish a statistical connection between the appearance of the feature in an e-mail message and between the likelihood of this e-mail to be a legitimate message or a spam message.

In the present example, the local statistics vector $\vec{v}_i(t)$ comprises a 2-by-2 contingency matrix, which is defined as $$c^i(t) = \begin{pmatrix} Pr(\text{Spam} \cap \text{feature}) & Pr(\char`\^\text{Spam} \cap \text{feature}) \\ Pr(\text{Spam} \cap \char`\^\text{feature}) & Pr(\char`\^\text{Spam} \cap \char`\^\text{feature}) \end{pmatrix} \quad [3]$$

wherein $\cap$ denoted logical AND, and $\char`\^$ denotes logical NOT. For example, $c_{1,2}^i(t)$ gives the likelihood, at time t, that an e-mail message received at node i is a legitimate message (not spam), and that this message contains the feature in question. $c_{1,1}^i(t)$ gives the likelihood that an e-mail message received at node i is a legitimate message, and that the message contains the feature.

The global statistics vector in the present example comprises a global contingency matrix, which is defined as $$c(t) = \frac{\sum_{i=1}^{n} w_i c^i(t)}{\sum_{i=1}^{n} w_i} \quad [4]$$

A certain feature can be considered a good predictor of spam if the information gain of the global contingency matrix c exceeds a certain threshold. The information gain, which in this case serves as the monitored function $f$, is defined as $$IG(c) = \sum_{j=1}^{2} \sum_{k=1}^{2} c_{j,k} \log\left[\frac{c_{j,k}}{(c_{j,1}+c_{j,2})(c_{1,k}+c_{2,k})}\right] \quad [5]$$

Thus, the global threshold condition of Equation [2] above can be written as $IG(c) > r$. In a typical application, the system may consider multiple features and may use multiple local and global contingency matrices.

In alternative embodiments, any other suitable local and global statistics vectors, as well as other types of monitored functions, can also be used. For example, in some embodiments the monitored function may comprise a Chi-square ($\chi^2$) function, which is compared to a threshold.

Geometric Representation of Monitoring Global Threshold Conditions

The task of comparing a function of the global statistics vector to a threshold can be represented geometrically, in a d-dimensional vector space that is spanned by the d statistical parameters maintained by the nodes. For example, when the (local and global) statistics vectors comprise 2-by-2 contingency matrices, the problem can be represented in a four-dimensional space, i.e., d=4.

Figure 2:
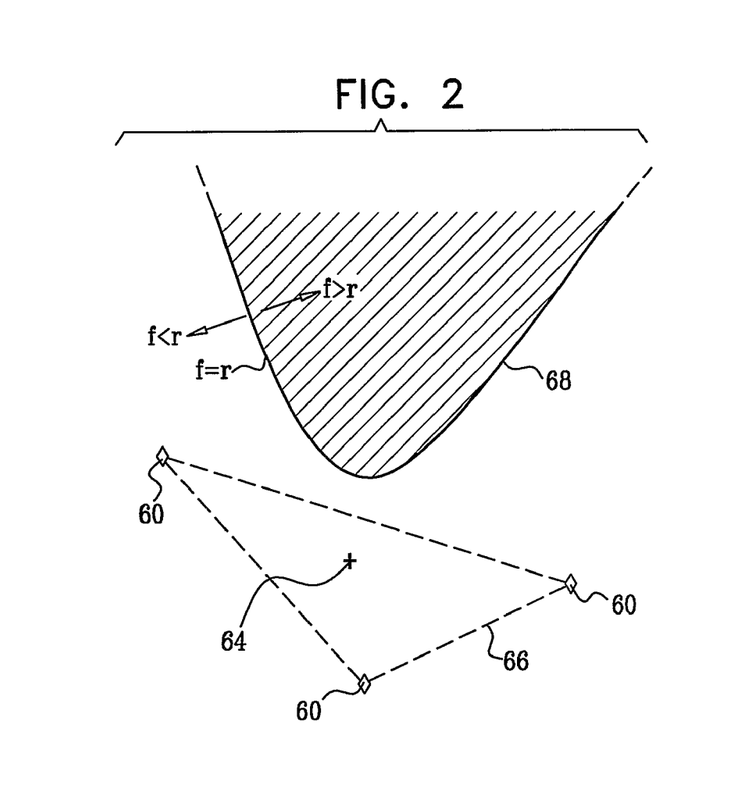
FIGS. 2 and 3 are diagrams that schematically illustrate a geometric representation of monitoring a threshold function defined over distributed data streams, in accordance with an embodiment of the present invention.
Figure 3:
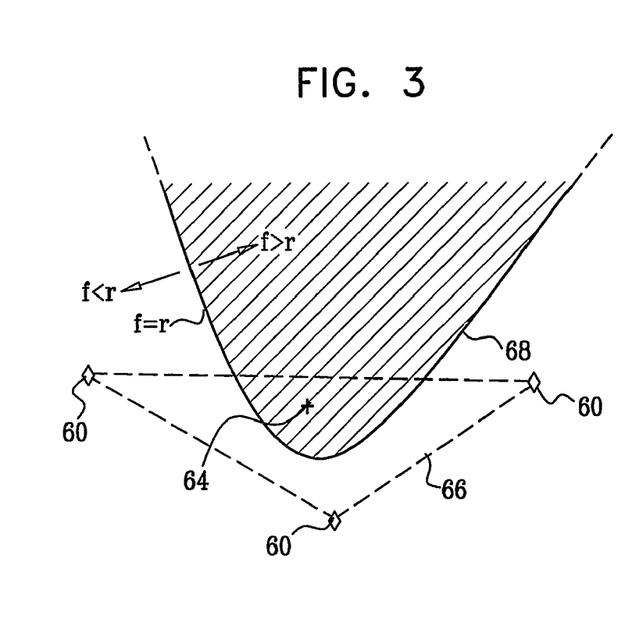

FIGS. 2 and 3 are diagrams that schematically illustrate a geometric representation of the global threshold monitoring task, in accordance with an embodiment of the present invention. These figures, as well as the figures that follow, refer to an exemplary two-dimensional (2-D) vector space for the sake of conceptual clarity. The principles of the present invention can be used, however, in vector spaces of any dimensionality.

Each local statistics vector $\vec{v}_i(t)$ is represented by a point 60 in the vector space. The d coordinates of point 60 correspond to the d instantaneous values of the elements of the local statistics vector. Thus, when the local statistics vector is updated over time by the node, the corresponding point 60 moves in the vector space. In the example of FIGS. 2 and 3, three nodes 24 maintain three local statistics vectors 60. The local statistics vectors are shown as diamond-shaped data points in the figures. The vector space coordinate of global statistics vector $\vec{v}(t)$ is marked by a cross 64.

The monitored function $f$ is represented by a curve 68 (or, more generally, a (d-1)-dimensional surface) in the vector space. The points that fall on one side of curve 68 correspond to vectors x for which $f(x) > r$, i.e., to vectors for which the monitored function is higher than the threshold. This region is marked by a gray, shaded pattern in the figures. The points on the other side of curve 68 correspond to vectors x for which $f(x) < r$, i.e., to vectors for which the monitored function is smaller than the threshold.

In other words, function $f$ and threshold r can be viewed as coloring the vector space in two different colors. Regions of the vector space in which $f > r$ are referred to as "gray" regions, and regions in which $f < r$ are referred to as "white" regions. The description that follows will often use this coloring terminology. For example, a certain d-dimensional volume in the vector space will be referred to as "monochromatic" if all of the vectors in this volume have the same color, i.e., if for every vector x in the volume, $f(x)$ falls on the same side of threshold r. A volume will be referred to as "polychromatic" if it contains at least two vectors that lie on opposite sides of the threshold, i.e., at least two vectors of different colors.

Since $\vec{v}(t)$ is a weighted average of the three $\vec{v}_i(t)$ vectors, it can be shown that global statistics vector 64 is always contained in a convex hull 66 of local vectors 60. (The convex hull of a set of vectors $\vec{v}_i$ is defined as $conv(v_1 \ldots v_n) = \{x = \lambda_1 v_1 + \ldots + \lambda_n v_n | \lambda_i \geq 0 \Sigma \lambda_i = 1\}$, i.e., as the collection of all linear combinations of the vectors, which use sets of non-negative coefficients whose sum equals unity.)

In the case of three vectors, convex hull 66 is a triangle connecting the vectors. When the vector space has a larger number of dimensions, and/or when the system comprises a larger number of local vectors 60, convex hull 66 may have a more complex shape. Nevertheless, it can be shown that global statistics vector 64 is always contained in the convex hull of local statistics vectors 60.

Each node 24 possesses information regarding the coordinate of its local statistics vector 60, and may determine on which side of curve 68 its local vector falls. In other words, each node can apply function $f$ to its local vector and determine whether the function is higher or lower than the threshold.

In general, however, the nodes do not have full information as to the coordinate of global statistics vector 64. Thus, the nodes cannot determine, based on their local statistics vectors, whether the global statistics vector falls on a particular side of curve 68, i.e., whether the function of the global statistics vector exceeds the threshold or not.

For example, FIG. 2 shows a situation in which the three local vectors 60, as well as global vector 64, fall below the threshold. As time passes, the values of the local statistics at nodes 24 change. FIG. 3 shows a different scenario, which corresponds to a later time with respect to FIG. 2. In FIG. 3, local statistics vectors 60 have moved to new coordinates, but remained on the same side of the threshold. Global statistics vector 64, however, moved to the opposite side of curve 68 and now falls above the threshold. As can be seen, it is not necessary for the local vectors to cross the threshold in order for the global vector to do so.

The status of global vector 64 with respect to the threshold can be estimated, however, by determining the status of convex hull 66 of the local vectors with respect to the threshold. Since the global vector is always contained in the convex hull, the global vector cannot cross the threshold without the convex hull crossing the threshold, i.e., becoming polychromatic, first. This property can be seen clearly in FIGS. 2 and 3. In other words, as long as convex hull 66 remains monochromatic, it is guaranteed that global vector 64 did not cross the threshold.

On the other hand, the convex hull may cross the threshold and become polychromatic without the global vector crossing the threshold. Therefore, declaring that the global vector crossed the threshold upon detection that the convex hull turned polychromatic may sometimes be wrong, or at least premature. This effect is particularly significant when the convex hull is large, and in particular when the global vector is distant from the boundary of the convex hull that first crosses the threshold. Thus, it is generally advantageous to reduce the size of convex hull 66, while guaranteeing that the global statistics vector remains contained within the reduced convex hull.

Figure 4:
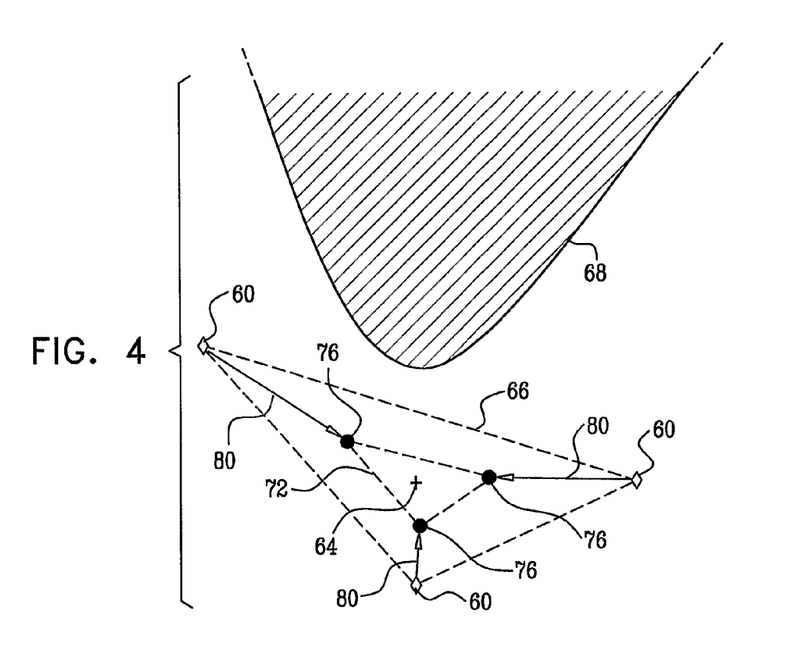
FIG. 4 is a diagram that schematically illustrates a process of reducing the convex hull of local statistics vectors, in accordance with an embodiment of the present invention.

FIG. 4 is a diagram that schematically illustrates a process of reducing the convex hull of local statistics vectors 60, in accordance with an embodiment of the present invention. FIG. 4 shows local vectors 60, convex hull 66 and global vector 64, which is contained within convex hull 66. Convex hull 66 is reduced by adding an offset vector 80 to each local vector 60, such that the weighted average of all offset vectors 80 is zero. The resulting adjusted vectors are referred to as drift vectors 76. The drift vectors define a reduced convex hull 72. Since the weighted average of the offset vectors is zero, global vector 64 is also equal to the average of drift vectors 76. Therefore, it is guaranteed that global vector 64 is contained within reduced convex hull 72.

Since convex hull 72 is smaller than convex hull 66, declaring that global statistics vector 64 crossed the threshold upon detecting that convex hull 72 becomes polychromatic is more accurate, in comparison with basing the decision on the larger convex hull 66.

In some embodiments, nodes 24 reduce the convex hull by initiating a mutual synchronization process. In coordinator-assisted configurations, each node sends its current local statistics vector 60 to coordinator 40. The coordinator calculates a global statistics vector, referred to as a global estimate, by calculating the weighted average of the n local vectors. The coordinator then transmits the global estimate to all nodes. In fully-decentralized configurations, each node broadcasts its local statistics vector to the other nodes. The nodes calculate the global estimate based on the n local vectors. Each node sets its offset vector 80 so that its drift vector 76 coincides with the global estimate.

Immediately after synchronization, the drift vectors of all nodes coincide with the global estimate and with the global statistics vector. At this point in time, the convex hull is reduced to a single point in the d-dimensional vector space, and the drift vectors of all nodes are on the same side of the threshold as the global vector.

The nodes store the value of the global estimate that was mutually agreed in the last synchronization process. The nodes also store, and continue to use, the values of their respective offset vectors 80. As time progresses, local statistics vectors 60 of the nodes change, and their drift vectors change accordingly. Convex hull 72 grows until the next synchronization process is initiated.

Global Threshold Monitoring Using Local Constraints

The methods and systems described herein detect that the global statistics vector crossed the threshold in a distributed manner and with minimal communication among the nodes. Immediately after synchronization, drift vectors 76 of the nodes and global statistics vector 64 are all on the same side of the threshold. As time passes, the drift vectors change and convex hull 72 grows. The methods and systems described herein enable the nodes to individually detect when the boundary of convex hull 72 crosses the threshold, indicating that global statistics vector 64 is likely to have crossed the threshold, as well.

In some embodiments, when a node detects that the convex hull became polychromatic, it typically initiates a synchronization process. The synchronization process ensures that the local statistics vectors of the nodes again reflect the status of the global statistics vector with respect to the threshold.

Thus, the methods and system described herein convert the global threshold monitoring problem into a set of local constraints, which are evaluated by the individual nodes based on their local statistics. As long as the local constraints are met at all the nodes, convex hull 72 is guaranteed to be monochromatic. Therefore, the status of the global statistics vector with respect to the threshold is known, and no communication is necessary. When one of the nodes detects that its local constraint is violated, it concludes that the convex hull is likely to have crossed the threshold and become polychromatic (such as, for example, in FIG. 3 above).

The separation of the global threshold monitoring problem into a set of locally-evaluated constraints is based on the fact that convex hull 72 is contained within the union of n d-dimensional spheres defined locally by the nodes. The sphere of a particular node is constructed by the node using two points: (1) the current drift vector 76 of the node and (2) a reference point 84 whose coordinate is known to all nodes. Each node constructs the sphere so that its drift vector 76 and reference point 84 lie on a diameter of the sphere. In other words, each sphere comprises the minimum-volume sphere that contains both the corresponding drift vector 76 and global reference point 84. The spheres are sometimes referred to herein as drift spheres.

In some embodiments, the global estimate that was distributed to the nodes in the last synchronization process is used as the globally-known reference point 84. In alternative embodiments, other points in the vector-space that are known to all nodes can be used as reference point. For example, the reference point may comprise a point on the medial axis defined by the threshold surface (curve 68).

Figure 5:
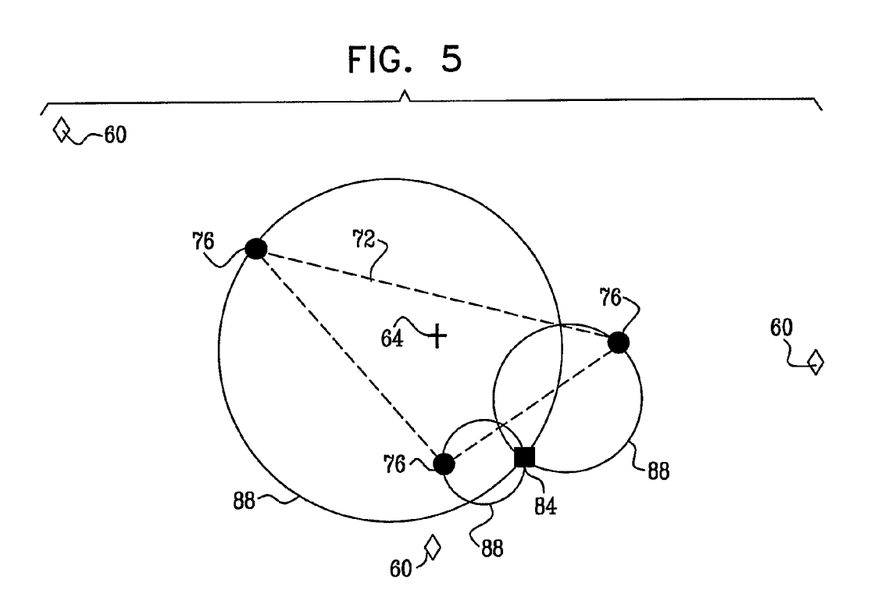
FIG. 5 is a diagram that schematically illustrates a convex hull bounded by a union of spheres, in accordance with an embodiment of the present invention.

FIG. 5 is a diagram that schematically illustrates convex hull 72 bounded by a union of drift spheres 88, in accordance with an embodiment of the present invention. The figure shows global statistics vector 64 (whose value is unknown to the nodes) contained within convex hull 72. The coordinate of global estimate 84 of the last synchronization process is known to all nodes. Each node defines its respective sphere 88, so that its drift vector 76 and global estimate 84 lie on a diameter of the sphere.

Under these conditions, it can be shown that convex hull 72 is contained within the union of spheres 88. Therefore, as long as the union of spheres 88 is monochromatic, global statistics vector 64 and all drift vectors 76 lie on the same side of the threshold.

Each node is able to detect when its sphere 88 becomes polychromatic (crosses the threshold), based solely on its local statistics. When a particular node detects that its sphere became polychromatic, it concludes that the union of spheres is polychromatic and that the global statistics vector may have crossed the threshold. The node acts upon this detection, such as by initiating a synchronization process.

The nodes can use any suitable method for checking the color uniformity of their spheres. For example, a node can find the minimum and maximum values of function $f$ within its sphere, and compare these two values to threshold r. If both values lie on the same side of the threshold, the sphere is concluded to be monochromatic.

As another example, the node can evaluate the distance between the center of the sphere and the threshold surface (i.e., the minimum distance between the center of the sphere and the vectors for which the value of the monitored function is equal to the threshold value), and compare this distance to the radius of the sphere. If the distance between the sphere center and the threshold surface is smaller than the radius of the sphere, the sphere is polychromatic. Otherwise, the sphere is monochromatic. Similar methods can be used with other bodies, such as ellipsoids and cylinders. In some embodiments, the color uniformity of a sphere can be verified using suitable hardware or firmware, or using a combination of software and hardware elements.

Note that as long as the local constraint of each node is met (i.e., as long as each node maintains that its sphere is monochromatic), no communication is exchanged over network 28. Communication is performed only when a node detects that its local constraint is violated a synchronization process is initiated.

Figure 6:
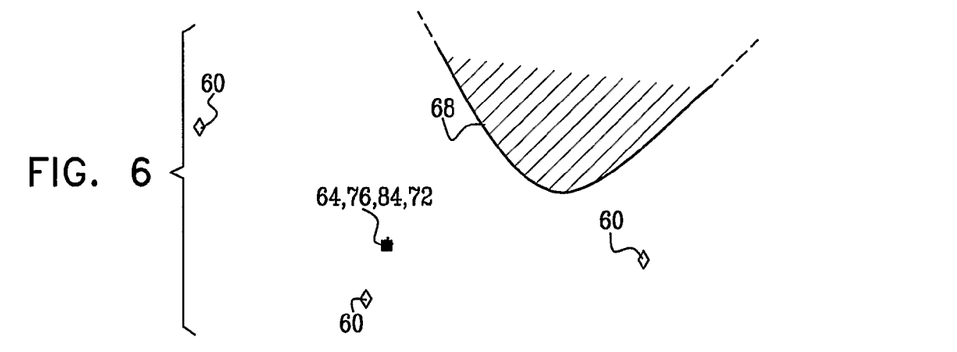
FIGS. 6-8 are diagrams that schematically illustrate a method for monitoring a threshold condition defined over distributed data streams, in accordance with an embodiment of the present invention.
Figure 7:
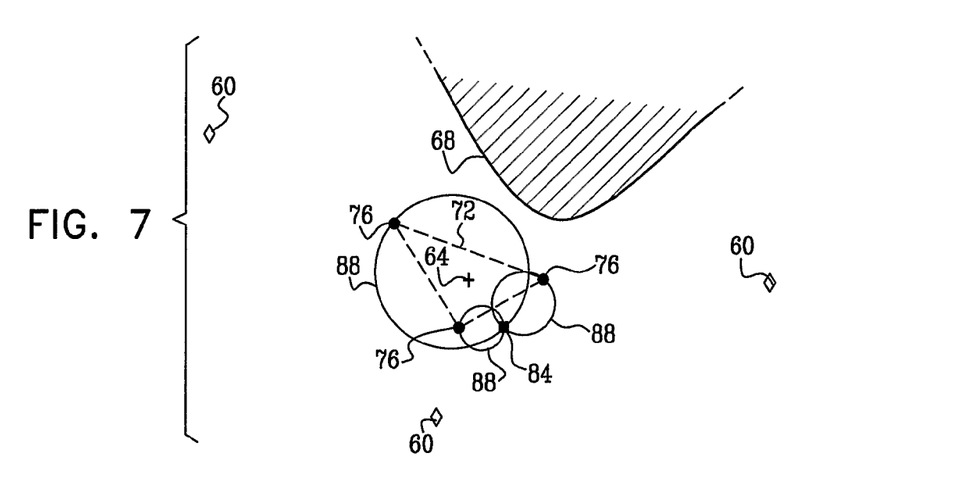
Figure 8:
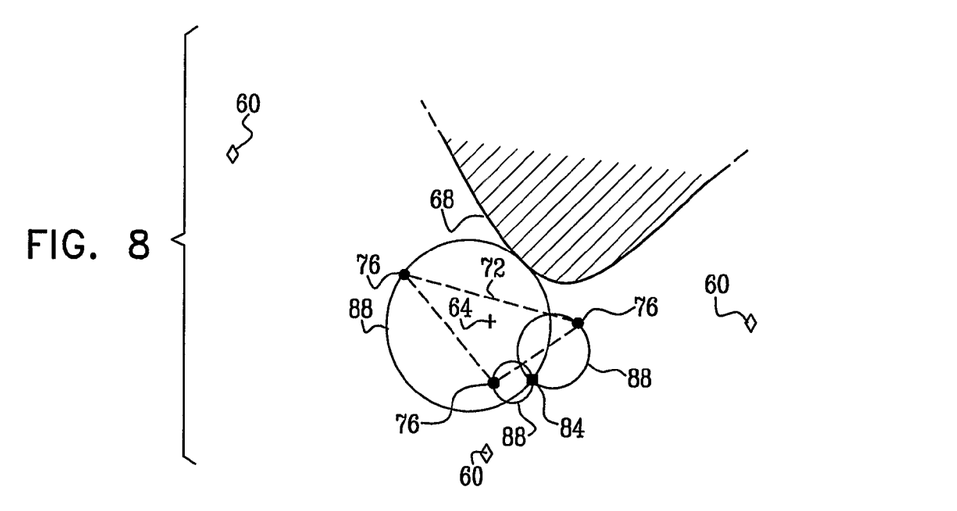

FIGS. 6-8 are diagrams that schematically illustrate the distributed monitoring method described above, in accordance with an embodiment of the present invention.

FIG. 6 shows the situation immediately following a synchronization process. Global statistics vector 64, convex hull 72, drift vectors 76 and global estimate 84 all coincide at a single point. Therefore, each node can determine the status of global statistics vector 64 with respect to the threshold, by evaluating the status of its drift vector 76.

FIG. 7 shows the vector space after a certain period of time. With time, local statistics vectors 60 and drift vectors 76 change, and convex hull 72 grows in size. Global estimate 84 remains fixed. Each node monitors its respective sphere 88. In FIG. 7, all spheres are monochromatic (in this case, white). Since the union of spheres is white, it is guaranteed that convex hull 72 is white, and therefore global statistics vector 64 is white. At this stage, the nodes do not communicate, and, as before, each node can determine the status (color) of the global statistics vector by evaluating the status (color) of its drift vector.

FIG. 8 shows the borderline situation in which one of spheres 88 reaches curve 68 and is about to become polychromatic. Once the respective node detects that its sphere is polychromatic, it acts upon the violated local constraint, such as by initiating a synchronization process.

Figure 9:
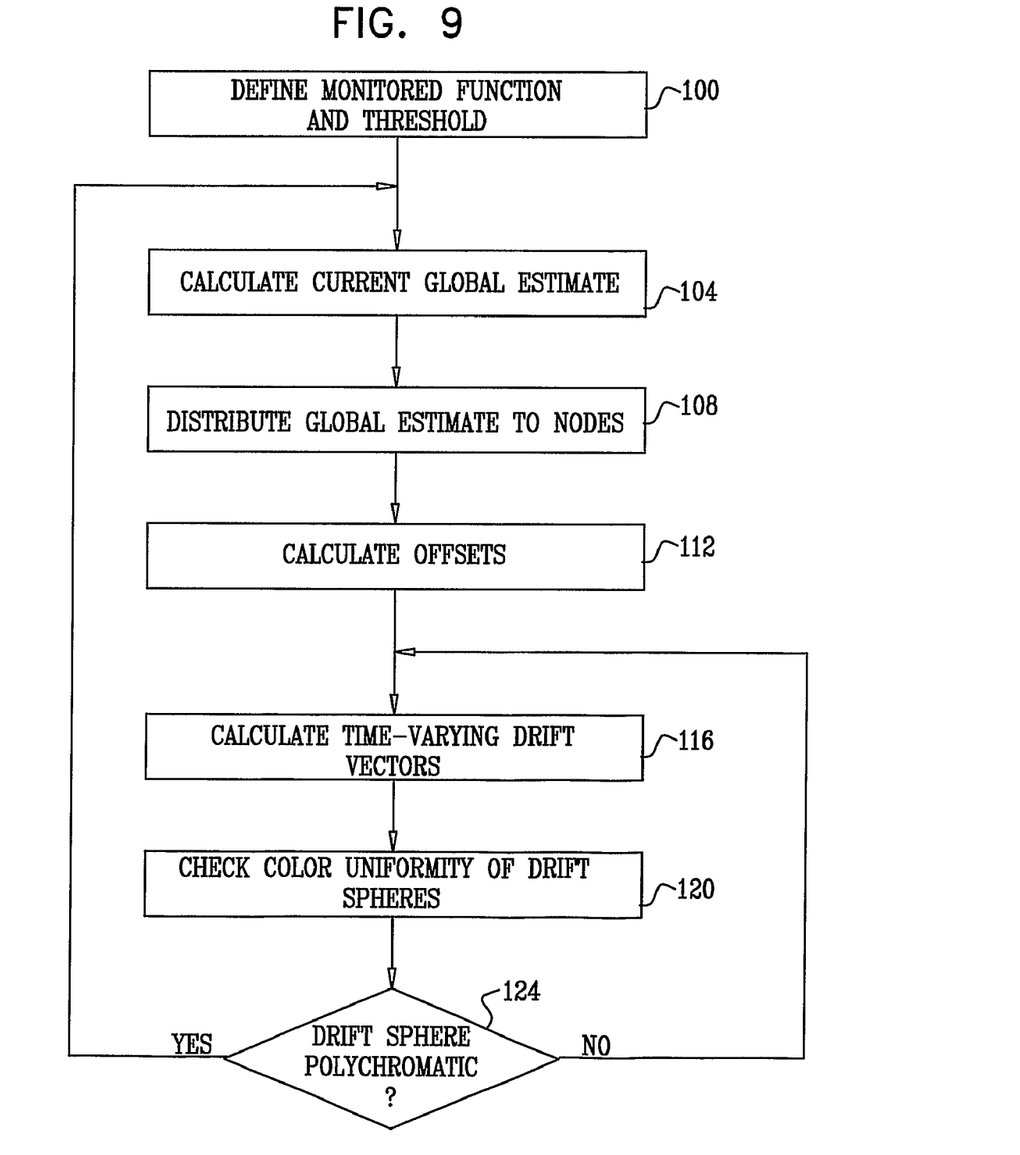
FIG. 9 is a flow chart that schematically illustrates a method for monitoring a threshold condition defined over distributed data streams, in accordance with an embodiment of the present invention.

FIG. 9 is a flow chart that schematically illustrates the distributed threshold monitoring method described above, in accordance with an embodiment of the present invention. The method begins by defining the monitored function $f$ and threshold r, at a definition step 100.

The nodes calculate the current global estimate, at an estimate calculation step 104. The global estimate is distributed to the nodes, at an estimate distribution step 108. In coordinator-assisted configurations, the nodes send their local statistics vectors to the coordinator, which in turn calculates the global estimate and transmits the global estimate to the nodes. In fully-decentralized configurations, each node broadcasts its local statistics vector to the other nodes. Each node calculates the global estimate based on the data received from the other node and on its own local statistics vector.

The nodes calculate the respective offset vectors, at an offset calculation step 112. Each node defines its offset vector such that its drift vector coincides with the global estimate. Steps 104-112 are collectively referred to as a synchronization process. An exemplary vector space immediately following synchronization is shown in FIG. 6 above.

As time passes, each node monitors its respective data stream. Each node updates its local statistics vector and drift vector, at a vector updating step 116. Each node evaluates its local constraint, at a local constraint evaluation step 120. Each node constructs a drift sphere using its current drift vector and the global estimate, as described above. Each node checks the color uniformity of its drift sphere, at a sphere color checking step 124.

As long as all drift spheres are monochromatic, the method loops back to step 116 above, and the nodes continue to update their local statistics and monitor their drift spheres. When a node detects that its drift sphere became polychromatic, it triggers a synchronization attempt. The method loops back to step 104 above, at which the synchronization process begins.

Balancing Subsets of Nodes

In many practical cases, the synchronization process described above is costly, in terms of computational complexity and communication load. In some embodiments, the cost of synchronization can be reduced by synchronizing only a subset of the nodes. This process is referred to as balancing.

In a balancing operation, a set of slack vectors is assigned to a partial subset of the nodes, such that the weighted average (weighted vector sum) of the slack vectors is zero. Each node in the subset adjusts its local statistics vectors by the respective slack vector, in addition to the adjustment performed using the offset vector. In other words, the nodes in the subset adjust their respective drift vectors by the slack vectors assigned to them. In some embodiments, the slack vectors are scaled using the respective weights $w_i$ assigned to the nodes. The balancing process can be performed either in a fully-distributed manner or with the assistance of a coordinator.

For example, consider a case in which two nodes have drift vectors that lie on opposite sides of the global estimate. In such a case, the balancing operation may significantly reduce the size of the convex hull and improve the efficiency of the method.

Bounding the Convex Hull Using Other Volumes

In the description above, convex hull 72 was bounded by a union of spheres, with each sphere defined as the minimum-volume sphere that contains the corresponding drift vector and a common reference point known to all nodes (e.g., the global estimate vector). Drift sphere $S_i$ is defined as:

$$S_i = \left\{ \vec{x} \left| \left( \vec{x} - \frac{\vec{u}_i + \vec{e}}{2} \right)^T \left( \vec{x} - \frac{\vec{u}_i + \vec{e}}{2} \right) \leq \left( \frac{\vec{u}_i - \vec{e}}{2} \right)^T \left( \frac{\vec{u}_i - \vec{e}}{2} \right) \right. \right\} \quad [6]$$

wherein $\vec{u}_i$ denotes the i'th drift vector and $\vec{e}$ denotes the global estimate.

In alternative embodiments, the local constraints can be defined using other types of volumes, as long as (1) the convex hull is bounded by the union of volumes and (2) each volume can be constructed independently by the respective node. In some practical cases, bounding convex hull 72 with a union of volumes other than spheres produces better results.

For example, in some embodiments convex hull 72 is bounded by a union of ellipsoids. Given ellipsoid parameters expressed as a positive-definite matrix denoted A, each node evaluates its local constraint by verifying the monochromaticity of the minimum-volume ellipsoid that contains the global estimate (or other globally-known reference point) and its drift vector. Ellipsoid $E_i$ is defined as:

$$E_i = \left\{ \vec{x} \left| \left( \vec{x} - \frac{\vec{u}_i + \vec{e}}{2} \right)^T A \left( \vec{x} - \frac{\vec{u}_i + \vec{e}}{2} \right) \leq \left( \frac{\vec{u}_i - \vec{e}}{2} \right)^T A \left( \frac{\vec{u}_i - \vec{e}}{2} \right) \right. \right\} \quad [7]$$

wherein T denotes matrix transposition.

Figure 10A:
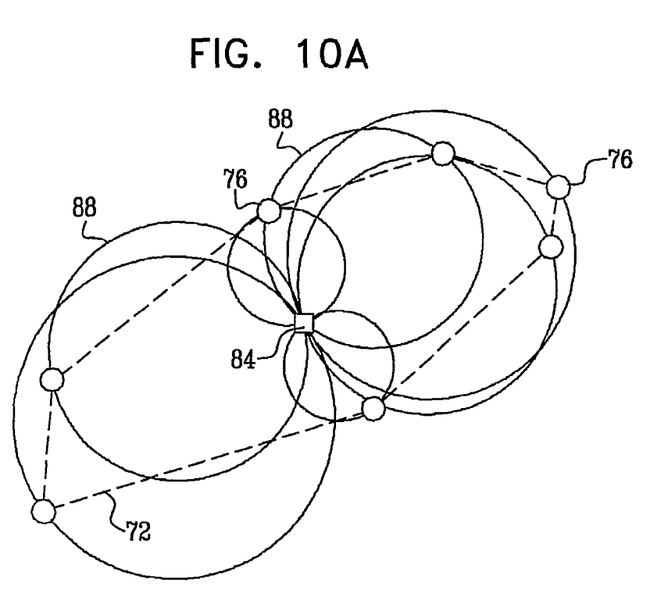
FIGS. 10A and 10B are diagrams that schematically illustrate a convex hull bounded by a union of spheres and by a union of ellipses, in accordance with embodiments of the present invention.
Figure 10B:
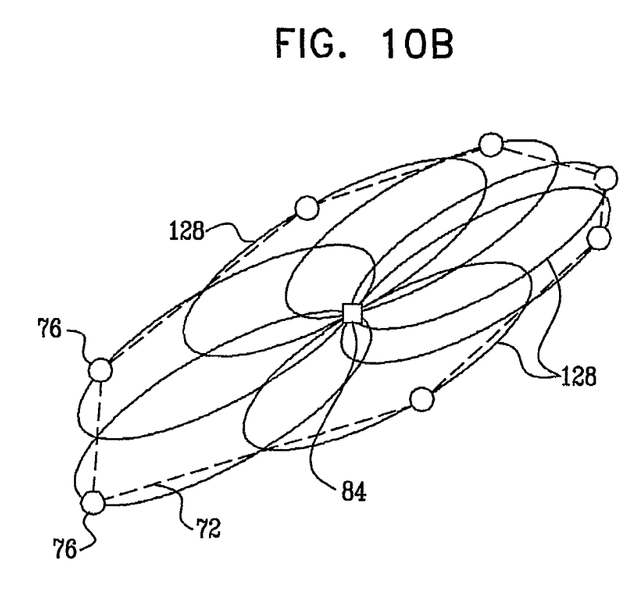

FIGS. 10A and 10B are diagrams that schematically illustrate convex hull 72 bounded by a union of spheres 88 and by a union of ellipses 128, in accordance with embodiments of the present invention. The figures demonstrate a practical case, in which ellipsoids (ellipses in the present two-dimensional example) provide a more accurate bound than spheres.

As can be seen in FIGS. 10A and 10B, convex hull 72 in the present example has an elongated shape. In this situation, as shown in FIG. 10A, bounding the convex hull with a union of spheres is inefficient. The union of spheres has a relatively large area that is outside of the convex hull. As a result, the union of spheres is likely to become polychromatic long before the convex hull becomes polychromatic, thus producing premature synchronization processes and unnecessary communication load.

FIG. 10B, on the other hand, shows the same convex hull, which is bounded by a set of ellipses 128 instead of a set of spheres. Ellipses 128 are parallel and have the same aspect ratio. In other words, the ellipses have parallel axes, and ratio between the two axes is the same for all ellipses. As can be appreciated, the union of ellipses 128 forms a much tighter bound on the convex hull. As a result, premature synchronization processes are avoided, and the communication load is reduced.

In alternative embodiments, the convex hull can be bounded by a union of parallel cylinders. Given a unit vector $\vec{w}$, each node verifies the monochromaticity of a minimum-radius cylinder, that is parallel to $\vec{w}$ and contains the drift vector and the global estimate. Cylinder $C_i$ is defined as:

$$C_i = \left\{ \vec{x} \left| \begin{array}{l} \left( \vec{x} - \frac{\vec{u}_i + \vec{e}}{2} \right)^T \left( \vec{x} - \frac{\vec{u}_i + \vec{e}}{2} \right) - \left( \left( \vec{x} - \frac{\vec{u}_i + \vec{e}}{2} \right)^T \vec{w} \right)^2 \leq \\ \left( \frac{\vec{u}_i - \vec{e}}{2} \right)^T \left( \frac{\vec{u}_i - \vec{e}}{2} \right) - \left( \left( \frac{\vec{u}_i - \vec{e}}{2} \right)^T \vec{w} \right)^2 \end{array} \right. \right\} \quad [8]$$

Trading-Off Precision and Communication Load

Generally, a trade-off exists between the accuracy of monitoring the value of the global threshold function and between the amount of communication load on network 28. In many cases, it is tolerable to monitor the global threshold with reduced accuracy, and in return to reduce the amount of communication among the nodes. Formally, let $\epsilon$ denote a tolerable error margin, monitoring errors can be tolerated in the vector space region in which $r-\epsilon < f \leq r+\epsilon$.

In some embodiments, the monitoring method described above can be tuned, so that the trade-off between accuracy and communication load is controlled. In these embodiments, two separate thresholds are defined. The process of checking whether a drift sphere is monochromatic is divided into two cases. Checking whether $f$ is smaller than the threshold over the entire sphere will use a threshold equal to $r+\epsilon$. Checking whether $f$ is larger than the threshold over the sphere will use a threshold equal to $r-\epsilon$. This hysteresis mechanism ensures that as long as the union of drift spheres does not cross the region $r-\epsilon < f \leq r+\epsilon$, no messages are transmitted. Geometrically, the two thresholds $r-\epsilon$ and $r+\epsilon$ define a $2 \cdot \epsilon$-wide hysteresis strip along curve 68.

Time-Varying Weights

In some embodiments, the weights $w_i$ assigned to the nodes vary over time, and are denoted $w_i(t)$, $i=1 \ldots n$. For example, in a spam filtering application, the weight of a particular node may depend on the number of messages received by the node. In these embodiments, each node transmits the current value of its weight with every message it transmits to the coordinator or to the other nodes. Each node also keeps track of the last transmitted weight value.

When a node (or the coordinator) calculates the global estimate vector, it calculates a weighted average of the local statistics vectors collected from the nodes. The weighting in this case is performed according to the weight values transmitted by the nodes. When applying balancing, or partial synchronization, the coordinator scales the slack vectors using the weight values transmitted by the nodes.

Experimental Results

The global threshold monitoring method described above was tested using a computer simulation in order to verify and demonstrate its performance and effectiveness. A distributed feature selection application was simulated. The data streams used were based on the Reuters Corpus (RCV1-v2), which is described by Rose et al., in "The Reuters Corpus Volume 1—From Yesterday's News to Tomorrow's Language Resources," Proceedings of the Third International Conference on Language Resources and Evaluation, Las Palmas de Grand Canaria, May, 2002, which is incorporated herein by reference.

The RCV1-v2 Corpus consists of 804,414 news stories, produced by the Reuters news agency August 1996 and August 1997. Each news story is regarded as a document and is categorized according to its content and assigned a unique identification number (ID). RCV1-v2 was processed by Lewis et al., as described in "RCV1: A New Benchmark Collection for Text Categorization Research," Journal of Machine Learning Research, volume 5, 2004, pages 361-397, which is incorporated herein by reference. A total of 47,236 features were extracted from the documents, and each document was represented using a feature vector, i.e., a vector of the features it contains.

In the computer simulation, n streams were generated by arranging the feature vectors in ascending order of the document IDs and assigning feature vectors to the streams using Round-Robin scheduling.

Figure 11:
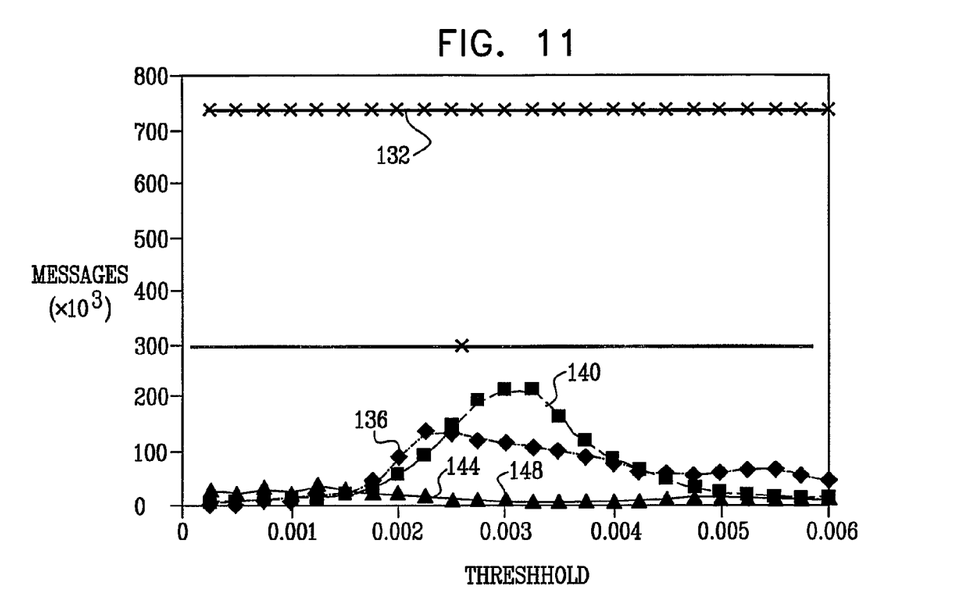
FIG. 11 is a graph showing a simulated communication load as a function of threshold value, in accordance with an embodiment of the present invention.

FIG. 11 is a graph showing the simulated communication load as a function of threshold value, in accordance with an embodiment of the present invention. The simulation tested a configuration of ten nodes in a fully-decentralized configuration, as explained above. Three textual features were monitored, namely "bosnia", "ipo" and "febru". The number of communication messages exchanged among the nodes when monitoring the three features was plotted against the threshold value.

A plot 132 shows the number of communication messages exchanged among the nodes in a conventional solution, in which the nodes continuously broadcast their local statistics vectors. This plot is used as a reference. A plot 136 shows the number of messages exchanged when using the disclosed method to monitor the "bosnia" feature. A plot 140 shows the number of messages exchanged when monitoring the "ipo" feature, and a plot 144 shows the number of messages exchanged when monitoring the "febru" feature.

As can be appreciated from the plots, the simulation shows that the disclosed method reduces the communication load considerably, in comparison with the conventional solution, over a wide range of threshold values.

Figure 12:
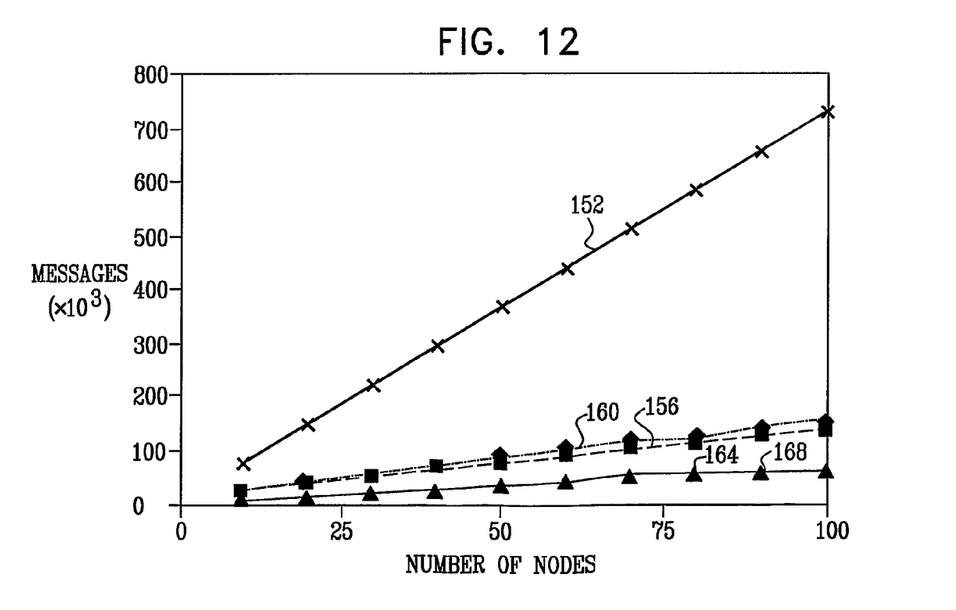
FIG. 12 is a graph showing a simulated communication load as a function of the number of nodes, in accordance with an embodiment of the present invention.

FIG. 12 is a graph showing the simulated communication load as a function of the number of nodes, in accordance with an embodiment of the present invention. A plot 152 shows the number of communication messages exchanged among the nodes using the conventional solution, as a function of the number of nodes. A plot 156 shows the number of messages exchanged when using the disclosed method to monitor the "bosnia" feature. A plot 160 shows the number of messages exchanged when monitoring the "ipo" feature. A plot 164 shows the number of messages exchanged when monitoring the "febru" feature.

As can be seen in the figure, when using the disclosed method, the communication load grows much more gradually with the number of nodes, in comparison with the conventional solution. This property demonstrates the scalability of the disclosed method and its applicability to applications having large numbers of nodes.

Alternative Embodiments and Additional Applications

The embodiments described herein referred to dividing the vector space into two regions, or colors, using a single monitored function and a single threshold. The principles of the present invention can be generalized in a straightforward manner to address multi-color problems, as well. For example, the vector space can be divided into multiple regions, or multiple colors, using a disjunction of multiple monitored functions, each having a corresponding threshold. Multi-color schemes can be useful, for example, for performing multi-category categorization problems over distributed data streams. The coloring scheme, whether comprising two colors or a plurality of colors, can be specified explicitly and is not necessarily derived from a function and a threshold.

The description above addresses the problem of monitoring multiple objects (e.g. features) by viewing the monitoring of each object as an independent monitoring task. In some cases, the global monitoring task comprises a composite task, which involves multiple objects that are interrelated. The interrelations among the monitoring tasks can be exploited in order to further improve the performance of the composite task. In some embodiments, the different objects may share some of the elements of the local and global statistics vectors. For example, in a spam filtering application, the correlation score of all features is typically affected by the relative quantity of spam mail items in the global data set. Additionally or alternatively, some objects may exhibit similar statistical behavior, e.g. synonymous words in the feature selection task. These similarities can be exploited, as well.

In the application of the methods described above to feature selection applications, features are selected when their correlation score exceeds a predetermined threshold. These methods can be generalized in a straightforward manner to select the top-k scoring features, i.e., the k features having the highest correlation scores.

Although the embodiments described herein mainly address the monitoring of distributed data streams, the principles of the present invention can also be used for additional applications, in which a global computational task is divided among multiple nodes. For example, the methods and systems described herein can be used for translating a threshold monitoring task into a parallel processing task that is carried out by multiple processors. The processors in this case are not necessarily distant from one another. The methods and systems described herein can be used to reduce the communication among such parallel processors when carrying out the global monitoring task. In some of these applications, only the final output of the parallel computational task is of interest, and there is no need for continuously providing real-time output as in the monitoring applications. For example, the methods and systems described herein can be used for feature selection in a large, static corpus of tagged documents. The corpus is partitioned among several nodes. Each node computes contingency tables for the various features based on its partition. Once the nodes have completed computing their respective contingency tables, the nodes employ geometric bounds, using the methods described above, in order to select features.

The distributed computation methods described herein can be used as building blocks in a higher-level system or process. For example, the methods described herein can be used to identify the most significant feature in a distributed set of documents. Then, the identified feature can be used by a higher level process to construct a decision tree over the distributed document set.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for distributed computing, comprising:
   at a plurality of computing nodes, processing respective sets of data and calculating respective local values of one or more statistical parameters characterizing the sets of the data;
   defining a global condition, which is violated when a function defined over a weighted average of the respective local values crosses a predetermined threshold;
   separating the global condition into a plurality of local constraints, comprising a respective local constraint to be evaluated by each of the nodes based on the respective local values, such that violation of the respective local constraint in at least one of the nodes indicates a violation of the global condition;
   evaluating the respective local constraint independently at each of the nodes; and
   when at least one of the nodes detects that the respective local constraint is violated, outputting an indication that the global condition has been violated,
   said evaluating the local constraint comprising, at each node:
   representing the local values as a local statistics vector in a d-dimensional vector space spanned by the statistical parameters;
   adjusting the local statistics vector by an offset vector to produce a drift vector, such that a weighted sum of the offset vectors used by the respective nodes equals zero;
   defining a d-dimensional geometrical shape in the vector space, such that a union of the d-dimensional geometrical shapes defined by the nodes bounds a convex hull of the drift vectors; and
   determining that the local condition is violated by detecting that the geometrical shape encloses at least two vectors such that the function evaluated at the two vectors produces two respective values that fall on opposite sides of the threshold.

2. The method according to claim 1, and comprising communicating among the nodes only when the at least one of the evaluated local constraints is violated.

3. The method according to claim 1, wherein defining the d-dimensional geometrical shape comprises occasionally performing a synchronization process, which comprises distributing the local statistics vectors among the nodes, calculating a global estimate vector comprising a weighted average of the local statistics vectors, and setting the offset vector such that the drift vector coincides with the global estimate vector.

4. The method according to claim 3, wherein defining the d-dimensional geometrical shape comprises defining the shape having a minimum volume while containing the drift vector and a common reference vector known to all the nodes.

5. The method according to claim 4, wherein the common reference vector comprises the global estimate vector.

6. The method according to claim 3, wherein distributing the local statistics vectors comprises transmitting the local statistics vectors from the nodes to a centralized coordinator node, calculating the global estimate vector by the coordinator node and transmitting the global estimate vector from the coordinator node to the nodes.

7. The method according to claim 1, wherein determining that the local constraint is violated comprises identifying first and second vectors having respective maximum and minimum values of the function within the geometrical shape, and determining that the maximum and minimum values of the function fall on opposite sides of the threshold.

8. The method according to claim 1, wherein determining that the local constraint is violated comprises calculating a minimum distance between a center of the geometrical shape and a d-dimensional surface over which the function is equal to the threshold, and determining that the minimum distance is smaller than a radius of the geometrical shape.

9. The method according to claim 1, wherein defining the d-dimensional geometrical shape comprises adjusting a subset of the drift vectors by respective slack vectors whose weighted sum equals zero, in order to tighten a bound of the convex hull by the union of the geometrical shapes.

10. The method according to claim 1, wherein defining the global condition comprises defining a first threshold and a second threshold larger than the first threshold, and wherein determining that the local condition is violated comprises verifying whether the function evaluated over all vectors within the geometrical shape is smaller than the second threshold or larger than the first threshold.

11. The method according to claim 1, wherein the geometrical shape comprises a d-dimensional sphere.

12. The method according to claim 1, wherein the geometrical shape comprises a d-dimensional ellipsoid, and wherein the d-dimensional ellipsoids defined by the nodes adhere to ellipsoid parameters defined by a single positive-definite matrix.

13. The method according to claim 1, wherein the weighted average is calculated using weights that vary over time.

14. The method according to claim 1, wherein processing the sets of the data comprises processing sets of textual items, wherein the statistical parameters characterize appearance of a feature in the textual items, and wherein defining the global condition comprises monitoring a global appearance frequency of the feature in the textual items.

15. The method according to claim 1, wherein processing the sets of the data comprises monitoring a respective distributed data stream at each of the nodes.

16. The method according to claim 15, wherein monitoring the data streams comprises monitoring outputs of respective sensors, wherein defining the global condition comprises defining an alert condition based on the weighted average of the outputs, and wherein outputting the indication comprises triggering an alert when the global condition is violated.

17. A computing node in a distributed computation system that includes a plurality of computing nodes that process respective sets of data, the node comprising:
   an interface, which is arranged to receive a set of data; and
   a processor, which is arranged to calculate local values of one or more statistical parameters characterizing the set of the data, to independently evaluate a local constraint, which is derived from a global condition that is violated when a function defined over a weighted average of the local values calculated by the respective nodes crosses a predetermined threshold such that violation of the respective local constraint in at least one of the nodes indicates a violation of the global condition, and to output an indication that the global condition has been violated when detecting that the local constraint is violated,
   said processor being arranged to evaluate the local constraint by:
   representing the local values as a local statistics vector in a d-dimensional vector space spanned by the statistical parameters;
   adjusting the local statistics vector by an offset vector to produce a drift vector, such that a weighted average of the offset vectors used by the respective nodes equals zero;

defining a d-dimensional geometrical shape in the vector space, such that a union of the d-dimensional geometrical shapes defined by the nodes bounds a convex hull of the drift vectors; and determining that the local condition is violated by detecting that the geometrical shape encloses at least two vectors such that the function evaluated at the two vectors produces two respective values that fall on opposite sides of the threshold.

18. A system for distributed computation comprising:

a plurality of computing nodes, each of said computing nodes including a processor and a storage device, which are arranged to process respective sets of data, to calculate respective local values of one or more statistical parameters characterizing the monitored sets of the data, to independently evaluate respective local constraints, which are derived from a global condition that is violated when a function defined over a weighted average of the local values calculated by the respective nodes crosses a predetermined threshold such that violation of the respective local constraint in at least one of the nodes indicates a violation of the global condition, and to output an indication that the global condition has been violated when at least one of the nodes detects that the respective local constraint is violated, said processor being arranged to evaluate the local constraint by:

representing the local values as a local statistics vector in a d-dimensional vector space spanned by the statistical parameters;

adjusting the local statistics vector by an offset vector to produce a drift vector, such that a weighted average of the offset vectors used by the respective nodes equals zero;

defining a d-dimensional geometrical shape in the vector space, such that a union of the d-dimensional geometrical shapes defined by the nodes bounds a convex hull of the drift vectors; and determining that the local condition is violated by detecting that the geometrical shape encloses at least two vectors such that the function evaluated at the two vectors produces two respective values that fall on opposite sides of the threshold.

19. A computer software product for use in a computer serving as a computing node in a distributed computation system that includes a plurality of computing nodes that process respective sets of data, the product comprising a tangible computer-readable medium, in which program instructions are stored, which instructions, when read by the computer, cause the computer to receive the respective set of the data, to calculate local values of one or more statistical parameters characterizing the monitored set of the data, to independently evaluate a local constraint, which is derived from a global condition that is violated when a function defined over a weighted average of the local values calculated by the respective nodes crosses a predetermined threshold such that violation of the respective local constraint in at least one of the nodes indicates a violation of the global condition, and to output an indication that the global condition has been violated when detecting that the local constraint is violated, said to evaluate a local constraint comprising:

to represent the local values as a local statistics vector in a d-dimensional vector space spanned by the statistical parameters;

to adjust the local statistics vector by an offset vector to produce a drift vector, such that a weighted sum of the offset vectors used by the respective nodes equals zero;

to define a d-dimensional geometrical shape in the vector space, such that a union of the d-dimensional geometrical shapes defined by the nodes bounds a convex hull of the drift vectors; and to determine that the local condition is violated by detecting that the geometrical shape encloses at least two vectors such that the function evaluated at the two vectors produces two respective values that fall on opposite sides of the threshold.

\* \* \* \* \*